US012293692B2

(12) United States Patent
Hwang et al.

(10) Patent No.: US 12,293,692 B2
(45) Date of Patent: May 6, 2025

(54) GAMMA CORRECTION APPARATUS FOR DISPLAY DEVICE AND GAMMA CORRECTION METHOD THEREFOR

(71) Applicant: Samsung Display Co., LTD., Yongin-si (KR)

(72) Inventors: Junho Hwang, Yongin-si (KR); Yoongyu Lee, Yongin-si (KR); Sunjoon Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/406,102

(22) Filed: Jan. 6, 2024

(65) Prior Publication Data

US 2024/0321165 A1 Sep. 26, 2024

(30) Foreign Application Priority Data

Mar. 24, 2023 (KR) ........................ 10-2023-0039092
Jul. 20, 2023 (KR) ........................ 10-2023-0094661

(51) Int. Cl.
*G09G 3/20* (2006.01)
*G09G 3/3225* (2016.01)

(52) U.S. Cl.
CPC ......... *G09G 3/2007* (2013.01); *G09G 3/3225* (2013.01); *G09G 2320/0285* (2013.01); *G09G 2320/0626* (2013.01); *G09G 2320/0666* (2013.01); *G09G 2320/0673* (2013.01); *G09G 2320/0693* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 8,279,234 | B2 | 10/2012 | Park et al. | |
| 11,176,875 | B2 | 11/2021 | Sohn et al. | |
| 11,710,461 | B2 | 7/2023 | Park et al. | |
| 2021/0256893 | A1 | 8/2021 | Moon et al. | |
| 2021/0383736 | A1* | 12/2021 | Hong .................. | G09G 3/3233 |

FOREIGN PATENT DOCUMENTS

| | | | |
|---|---|---|---|
| KR | 101469025 | B1 | 12/2014 |
| KR | 1020210049607 | A | 5/2021 |
| KR | 1020210104470 | A | 8/2021 |
| KR | 1020220131459 | A | 9/2022 |

* cited by examiner

*Primary Examiner* — Carl Adams
(74) *Attorney, Agent, or Firm* — CANTOR COLBURN LLP

(57) ABSTRACT

A gamma correction apparatus for a display device, includes: a measurer configured to measure an optical characteristic of a display panel; and a gamma data generator configured to generate measurement gamma data for at least one measurement gray level pre-determined from among a plurality of gray levels, based on the optical characteristic received from the measurer, generate prediction gamma data for at least one prediction gray level other than the at least one measurement gray level from among the plurality of gray levels by using an equation defining a relationship between a gray level and an optical characteristic, and generate gray level-wise gamma data, based on the measurement gamma data and the prediction gamma data.

18 Claims, 14 Drawing Sheets

530

D532

| REGRESSION ANALYSIS STATISTICS | |
|---|---|
| MULTIPLE CORRELATION COEFFICIENT | 0.998183369 |
| DETERMINATION COEFFICIENT | 0.996370038 |
| ADJUSTED DETERMINATION COEFFICIENT | 0.99636583 |
| STANDARD ERROR | 0.003407264 |
| NUMBER OF OBSERVATIONS | 7772 |

D533

| | COEFFICIENT | STANDARD ERROR |
|---|---|---|
| Y INTERCEPT | −0.064444099 | 0.003981084 |
| Vol_MTP_255_x | 0.014380578 | 0.005626093 |
| Vol_MTP_255_y | −0.047041612 | 0.008558739 |
| Vol_MTP_255_u | 0.05042446 | 0.005677769 |

D534

RESIDUAL OUTPUT

| NUMBER OF OBSERVATIONS | PREDICTION VALUE Vol_MTP_35_x | RESIDUAL | STANDARD RESIDUAL |
|---|---|---|---|
| 1 | 4.575258639 | −0.003958639 | −1.1625 |
| 2 | 4.529377332 | 2.26682E−05 | 0.006657 |
| 3 | 4.599755771 | 0.002044229 | 0.60031 |
| 4 | 4.622048267 | 0.004551733 | 1.336665 |
| 5 | 4.544583734 | 0.008016266 | 2.354062 |

FIG. 10

D1010

| GRAY LEVEL | LUMINANCE (nit) | COLOR COORDINATES |
|---|---|---|
| 255 | 1198 | (0.68, 0.32) |
| 203 | 900 | (0.68, 0.32) |
| 151 | 713 | (0.68, 0.32) |
| 87 | 80 | (0.68, 0.32) |
| 51 | 32 | (0.68, 0.32) |
| 13 | 7.2 | (0.68, 0.32) |
| ⋮ | ⋮ | ⋮ |

D1020

| GRAY LEVEL | RGB VOLTAGE VALUE (dBV) |
|---|---|
| 255 | Red x, Green y, Blue z |
| 203 | Red a, Green b, Blue c |
| 151 | Red d. Green e, Blue f |
| 87 | ~ |
| 51 | ~ |
| 13 | ~ |
| ⋮ | ⋮ |

GAMMA CORRECTION APPARATUS FOR DISPLAY DEVICE AND GAMMA CORRECTION METHOD THEREFOR

This application claims priority to Korean Patent Application No. 10-2023-0039092, filed on Mar. 24, 2023, and Korean Patent Application No. 10-2023-0094661, filed on Jul. 20, 2023, and all the benefits accruing therefrom under 35 U.S.C. § 119, the contents of which in their entirety are herein incorporated by reference.

BACKGROUND

1. Field

One or more embodiments relate to a gamma correction apparatus for a display device and a gamma correction method therefor.

2. Description of the Related Art

A display device includes pixels and each pixel may include a light-emitting device and a transistor configured to drive the light-emitting device. Due to a deviation in a manufacturing process, a deviation may occur in an image quality characteristic.

SUMMARY

One or more embodiments include a method of performing further accurate gamma correction by predicting a gamma value of a display device by using big data.

Additional aspects will be set forth in part in the description which follows and, in part, will be apparent from the description, or may be learned by practice of the presented embodiments of the disclosure.

According to one or more embodiments, a gamma correction apparatus for a display device, includes: a measurer configured to measure an optical characteristic of a display panel, and a gamma data generator configured to generate measurement gamma data for at least one measurement gray level pre-determined from among a plurality of gray levels, based on the optical characteristic received from the measurer, generate prediction gamma data for at least one prediction gray level other than the at least one measurement gray level from among the plurality of gray levels by using an equation defining a relationship between a gray level and an optical characteristic, and generate gray level-wise gamma data, based on the measurement gamma data and the prediction gamma data.

The gamma data generator may be further configured to generate some of the gray level-wise gamma data for the at least one measurement gray level by comparing the measurement gamma data for the at least one measurement gray level, received from the measurer, with target gamma data.

The gamma data generator may be further configured to determine the prediction gamma data as some of the gray level-wise gamma data for the at least one prediction gray level when the prediction gamma data for the at least one prediction gray level matches a pre-determined specification range.

The gamma data generator may be further configured to receive, from the measurer, an optical characteristic measured for the at least one prediction gray level when the prediction gamma data for the at least one prediction gray level does not match the pre-determined specification range, and generate measurement gamma data for the at least one prediction gray level, based on the optical characteristic of the at least one prediction gray level.

The gamma data generator may be further configured to generate the some of the gray level-wise gamma data for the at least one prediction gray level by comparing the measurement gamma data for the at least one prediction gray level, received from the measurer, with target gamma data.

The optical characteristic may include a luminance value and color coordinates, and the measurement gamma data and the prediction gamma data may each be RGB data including information about the luminance value and the color coordinates.

The RGB data may be an RGB analog voltage value.

The RGB data may be an RGB digital code value.

The gamma data generator may be further configured to generate the equation in real time, based on gamma data for the at least one measurement gray level and gamma data for the at least one prediction gray level, which are pre-generated.

The gamma data generator may include a memory in which pieces of measurement gamma data for each gray level, generated for a plurality of display panels, are accumulated for a certain period of time, and the gamma data generator may be further configured to generate the equation, based on the pieces of measurement gamma data accumulated in the memory.

The gamma data generator may be further configured to generate the prediction gamma data in an order from a high gray level to a low gray level.

The color coordinates may be determined based on a color temperature of 10000 Kevin (K).

The prediction gamma data may be generated based on pieces of gamma data for the at least one measurement gray level and the at least one prediction gray level, which are pre-generated, a driving voltage of the display panel, and information about dark data.

The equation may be generated according to a linear regression analysis technique in which the prediction gamma data is a dependent variable and the pieces of gamma data for the at least one measurement gray level and the at least one prediction gray level, which are pre-generated, are independent variables.

Gray level-wise optical characteristics of the plurality of display panels may be stored in the memory in a form of a look-up table.

According to one or more embodiments, a gamma correction method for a display device, includes: measuring an optical characteristic of a display panel of the display device for at least one measurement gray level pre-determined from among a plurality of gray levels; generating measurement gamma data for the at least one measurement gray level, based on an optical characteristic for the at least one measurement gray level; generating prediction gamma data for at least one prediction gray level other than the at least one measurement gray level from among the plurality of gray levels, by using an equation defining a relationship between a gray level and an optical characteristic; and generating gray level-wise gamma data, based on the measurement gamma data and the prediction gamma data.

The generating for the gray level-wise gamma data may include: generating gamma data for the at least one measurement gray level among the gray level-wise gamma data by comparing the measurement gamma data for the at least one measurement gray level with target gamma data; and determining the prediction gamma data as gamma data for the at least one prediction gray level among the gray level-wise gamma data when the prediction gamma data for the at least one prediction gray level matches a pre-determined specification range.

The generating of the gray level-wise gamma data may further include: generating measurement gamma data for the at least one prediction gray level, based on an optical characteristic measured for the at least one prediction gray level when the prediction gamma data for the at least one prediction gray level does not match the pre-determined specification range, and generating the gamma data for the at least one prediction gray level among the gray level-wise gamma data by comparing the measurement gamma data for the at least one prediction gray level with the target gamma data, when the prediction gamma data for the at least one prediction gray level does not match the pre-determined specification range.

The optical characteristic may include a luminance value and color coordinates, and the measurement gamma data and the prediction gamma data are each RGB data including information about the luminance value and the color coordinates.

The equation may be generated according to a linear regression analysis technique in which the prediction gamma data is a dependent variable and pieces of gamma data for the at least one measurement gray level and the at least one prediction gray level, which are pre-generated, are independent variables.

According to one or more embodiments, a computer program stored in a computer-readable recording medium for executing the gamma correction method may be further provided.

According to one or more embodiments, a computer-readable recording medium having recorded thereon a computer program for executing the gamma correction method may be further provided.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a diagram showing a luminance value and color coordinates for a gray level being converted into RGB data for the gray level, according to an embodiment.

DETAILED DESCRIPTION

Figure 1A:
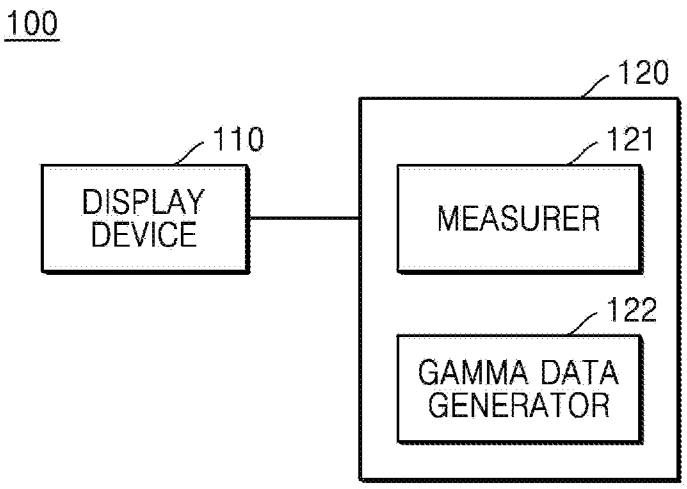
FIG. 1A is a diagram schematically showing a gamma correction system for a display device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b, and c" indicates only a, only b, only c, both a and b, both a and c, both b and c, all of a, b, and c, or variations thereof.

Throughout the disclosure, like reference numerals denote like elements. The present disclosure does not describe all elements of the embodiments, and generic content in the technical field of the disclosure or redundant content of the embodiments is omitted. The terms "unit (-er/or)," "module," "member," and "block" used in the specification may be realized as software or hardware, and a plurality of "units (-ers/ors)," "modules," "members," or "blocks" may be realized as one element or one "unit (-er/or)," "module," "member," or "block" may include a plurality of elements, according to embodiments.

Throughout the specification, when a part is "connected" to another part, the part may be connected to the other part directly or indirectly, and an indirect connection includes a connection through a wireless communication network.

In addition, when a part "comprises (includes)" a certain element, the part may further include another element instead of excluding the other element, unless otherwise stated.

The terms such as "first," "second," and the like are used to distinguish one element from another, and elements are not limited by such terms. The above terms are used only to distinguish one element from another.

An expression used in the singular encompasses the expression in the plural, unless it has a clearly different meaning in the context.

Reference signs or reference numerals in operations are used for convenience of description, but the reference signs or reference numerals do not describe the order of operations, and the operations may be executed in the order different from a stated order unless a specific order is explicitly stated in context.

Hereinafter, embodiments will be described in detail with reference to the accompanying drawings, and in the following description with reference to the drawings, like reference numerals refer to like elements and redundant descriptions thereof will be omitted.

FIG. 1A is a diagram schematically showing a gamma correction system 100 for a display device 110, according to an embodiment.

Referring to FIG. 1A, the gamma correction system 100 may include the display device 110 and a gamma correction apparatus 120 to perform operations of the disclosure.

Referring to FIG. 1A, the display device 110 may receive a driving signal including generated pieces of gamma data of a measurement gray level and a prediction gray level from the gamma correction apparatus 120 by communicating with the gamma correction apparatus 120, and a display panel of the display device 110 may emit light, based on the received driving signal. The display device 110 will be described in detail below with reference to FIG. 1C.

The gamma correction apparatus 120 may include a measurer 121 configured to measure an optical characteristic of the display panel included in the display device 110, and a gamma data generator 122 configured to generate the gamma data of the measurement gray level and/or the prediction gray level by receiving a plurality of pieces of measurement data obtained by measuring optical characteristics of a plurality of display panels. However, the gamma correction system 100 is not limited by such a configuration, and may further include a configuration for gamma correction of a display device or may exclude a configuration.

In the present specification, examples of the gamma correction apparatus 120 according to the disclosure include various apparatuses for providing a result to a user by performing operation processing. For example, the gamma correction apparatus 120 according to the disclosure may include all of a computer, a server device, and a portable terminal, or may be in the form of any one thereof.

Gamma correction may be performed based on the gamma data generated by the gamma correction apparatus 120, and the generated gamma data may be recorded in the display device 110. Here, the gamma data may denote a gamma correction value.

Figure 1B:
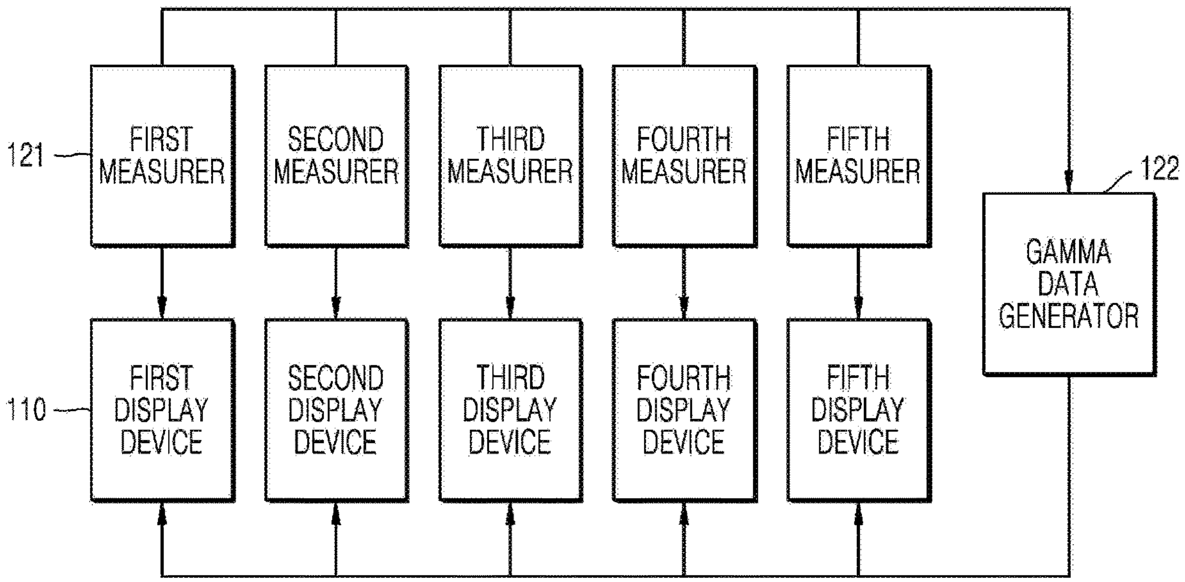
FIG. 1B is a diagram schematically showing collecting of big data on optical characteristics of a plurality of display devices, according to an embodiment.

FIG. 1B is a diagram schematically showing collecting of big data on optical characteristics of a plurality of display devices, according to an embodiment.

Referring to FIG. 1B, the measurer 121 may measure the optical characteristic of the display panel included in the display device 110, and transmit the same to the gamma data generator 122. The gamma data generator 122 may generate measurement gamma data, based on the measurement data received from the measurer 121. The measurer 121 may be implemented as a measuring device (e.g., camera).

According to the disclosure, the gamma data generator 122 is to generate prediction gamma data of the plurality of display devices by using the big data related to the optical characteristics of the plurality of display devices, which are measured by a plurality of measurers.

According to an embodiment, first to fifth measurers of FIG. 1B may simultaneously measure display optical characteristics of first to fifth display devices, respectively, and the gamma data generator 122 may receive the same and predict and generate gamma data for each of the first to fifth display devices in real time. According to another embodiment, the gamma data generator 122 may predict and generate the gamma data for each of the first to fifth display devices by using real-time measurement optical characteristic data and pre-stored accumulated data of display optical characteristics.

The gamma data may denote a gamma value for gamma correction, and may include information about a gray level, a luminance value, and color coordinates. The gamma data may be represented in an analog voltage value and/or a digital code.

FIG. 1B is not limited by the first to fifth measurers and the first to fifth display devices, and may illustrate that a plurality of measurers may simultaneously measure optical characteristics of display panels of a plurality of display devices and transmit the same to a gamma data generator. Although not illustrated, the gamma correction apparatus 120 may further include a plurality of drivers configured to drive display devices for optical characteristic measurement.

Figure 1C:
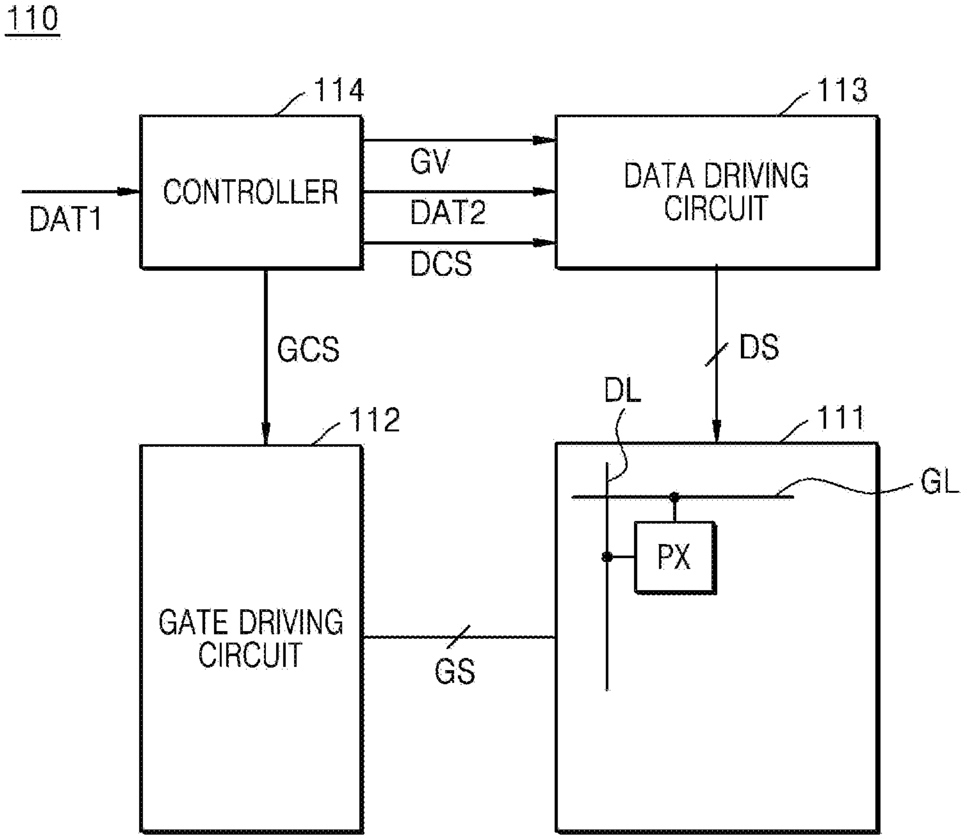
FIG. 1C is a diagram schematically showing components of a display device, according to an embodiment.

FIG. 1C is a diagram schematically showing components of the display device 110, according to an embodiment.

Referring to FIG. 1C, the display device 110 may include a pixel unit 111, a gate driving circuit 112, a data driving circuit 113, and a controller 114.

A plurality of pixels PX and signal lines applying electric signals to the plurality of pixels PX may be arranged in the pixel unit 111. The pixel unit 111 may be a display area where an image is displayed.

The plurality of pixels PX may be repeatedly arranged in a first direction (an X-axis direction or a row direction) and a second direction (a Y-axis direction or a column direction). The plurality of pixels PX may realize an image by being arranged in any one of various forms, such as a stripe arrangement, a pentile arrangement and a mosaic arrangement. The plurality of pixels PX may each include an organic light-emitting diode as a display element, and the organic light-emitting diode may be connected to a pixel circuit. The pixel circuit may include a plurality of transistors and at least one capacitor.

The signal lines applying the electric signals to the plurality of pixels PX may include a plurality of gate lines GL extending in the first direction and a plurality of data lines DL extending in the second direction. The plurality of gate lines GL may be spaced apart from each other in the second direction and transmit a gate signal GS to the pixels PX. The plurality of data lines DL may be spaced apart from each other in the first direction and transmit a data signal DS to the pixels PX. Each of the plurality of pixels PX may be connected to at least one corresponding gate line GL from among the plurality of gate lines GL, and a corresponding data line DL from among the plurality of data lines DL. In FIG. 1C, one gate line GL is connected to the pixel PX for convenience of illustration, but each pixel PX may be connected to a plurality of gate lines GL depending on the number of transistors constituting the pixel circuit.

The gate driving circuit 112 may be connected to the plurality of gate lines GL, and configured to generate the gate signal GS in response to a gate control signal GCS from the controller 114, and sequentially supply the same to the gate lines GL.

The data driving circuit 113 may be connected to the plurality of data lines DL, and configured to supply the data signal DS to the data lines DL, in response to a data control signal DCS from the controller 114. The data driving circuit 113 may receive, from the controller 114, image data DAT2 and gamma voltages GV corresponding to gray levels, respectively, and generate the data signal DS corresponding to the gray levels.

The controller 114 may generate the gate control signal GCS and the data control signal DCS, based on signals input from an external source. The controller 114 may supply the gate control signal GCS to the gate driving circuit 112 and supply the data control signal DCS to the data driving circuit 113.

The controller 114 may generate the image data DAT2 by converting input image data DAT1 input from an external source (e.g., a graphics processor). For example, the controller 114 may convert the input image data DAT1 in an RGB format into the image data DAT2 in a format matching a pixel arrangement of the pixel unit 111. The controller 114 may include a storage storing correction data and gamma voltages corresponding to the gray levels.

In FIG. 1C, the data driving circuit 113 and the controller 114 are independent from each other, but an embodiment is not limited thereto. For another example, the data driving circuit 113 and the controller 114 may be realized as one integrated circuit ("IC") (e.g., a driving IC).

The display device 110 according to an embodiment may be a display device such as an inorganic light-emitting display, an organic light-emitting display (or an organic EL display), or a quantum dot light-emitting display.

In the above-described embodiment, gamma voltage correction by the gamma correction apparatus 120 separate from the display device 110 has been described, but the disclosure is not limited thereto. According to another embodiment, a corrector of a gamma correction apparatus 120 of FIG. 1A may be included in the controller 114 in an IC of the display device 110 of FIG. 1C, and the controller 114 may perform the above-described gamma correction. According to another embodiment, the corrector of the gamma correction apparatus 120 of FIG. 1A may be included in an external device such as an application processor ("AP").

The display device 110 may be used as a display screen of not only to a portable electronic device, such as a mobile phone, a smartphone, a tablet personal computer ("PC"), a mobile communication terminal, an electronic notebook, an electronic book, a portable multimedia player ("PMP"), a navigation device, or an ultra-mobile PC ("UMPC"), but also to any one of various products, such as a television, a laptop computer, a monitor, a billboard, and an Internet of things ("IoT") device. Also, the display device 110 according to an embodiment may be used for a wearable device, such as a smart watch, a watch phone, a glasses-type display, or a head mounted display ("HMD"). In addition, the display device 110 according to an embodiment may be used as a panel of a vehicle, a center information display ("CID") arranged on a center fascia or dashboard of a vehicle, a room mirror display replacing a side mirror of a vehicle, or a display arranged on a rear surface of a front seat, as entertainment for a back seat of a vehicle.

Figure 2:
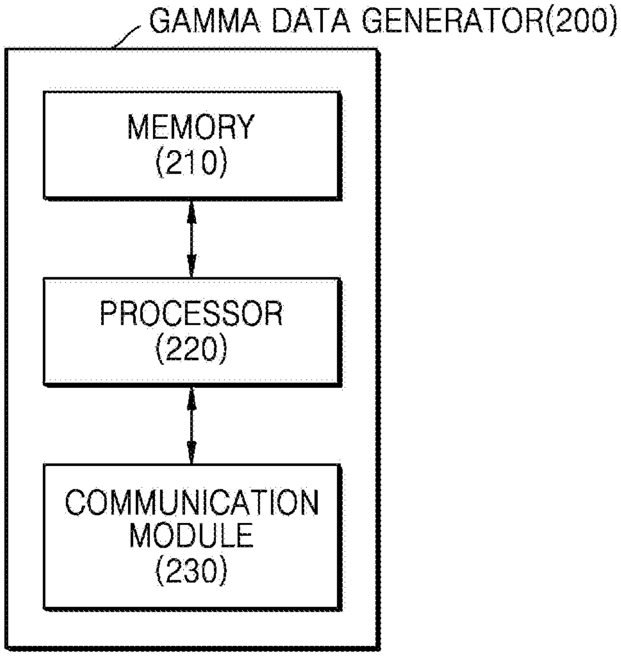
FIG. 2 is a diagram schematically showing components of a gamma data generator, according to an embodiment.

FIG. 2 is a diagram schematically showing components of a gamma data generator 200, according to an embodiment.

Referring to FIG. 2, a gamma data generator 200 configured to generate a gamma value for gamma correction of the gamma correction apparatus 120 of FIG. 1A may include a memory 210, a processor 220, and a communication module 230 (or a communicator).

The components shown in FIG. 2 are not essential in realizing the gamma data generator 200 according to the disclosure, and thus the gamma data generator 200 described in the present specification may include more or fewer components than listed above.

The memory 210 may store an optical characteristic measurement value received from the measurer 121, gamma data generated by the gamma data generator 200, and a program for operations of the processor 220, store pieces of input/output data, and store a plurality of application programs (or applications) driven by the processor 220 of the gamma data generator 200 and pieces of data and instructions for operations of the gamma data generator 200. At least some of the application programs may be downloaded from an external server through wireless communication. The memory 210 may store accumulated data of measured optical characteristics. Gray level-wise optical characteristics of the plurality of display panels may be stored in the memory 210 in the form of a look-up table.

The memory 210 may include at least one type of storage medium from among a flash memory type, hard disk type, solid state disk ("SSD") type, silicon disk drive ("SDD") type, multimedia card micro type, or card type memory (e.g., a secure digital or extreme digital ("XD") memory), random access memory ("RAM"), static RAN ("SRAM"), read-only memory ("ROM"), electrically erasable programmable ROM ("EEPROM"), programmable ROM ("PROM"), a magnetic memory, a magnetic disk, and an optical disk. Also, the memory 210 may be a database that is separated from the gamma data generator 200 but is connected thereto wirelessly or via wires.

A controller of the gamma data generator 200 may be realized by the memory 210 storing an algorithm for controlling operations of the components or data for a program implementing the algorithm, and at least one processor 220 configured to perform the above-described operations by using the data stored in the memory 210 by communicating with the memory 210. Here, the memory 210 and the processor 220 may be implemented in individual chips, respectively. Alternatively, the memory 210 and the processor 220 may be implemented in a single chip.

Also, the processor 220 may control one or a combination of the above components to realize various embodiments described below with reference to FIGS. 3 to 10, on the gamma data generator 200.

Among the components, the communication module 230 may include at least one component enabling communication with a measurer to receive, from the measurer, a measured optical characteristic of a display device, and for example, may include at least one of a broadcast receiving module, a wired communication module, a wireless communication module, a short-range communication module, and a position information module.

At least one component may be added or eliminated in response to performances of the components of FIG. 2. Also, it would be easily understood by one of ordinary skill in the art that mutual positions of the components may change in response to a performance or structure of a system.

Meanwhile, each component of the gamma data generator 200 shown in FIG. 2 may denote a software component and/or a hardware component such as a field programmable gate array ("FPGA") or an application-specific IC ("ASIC").

Figure 3:
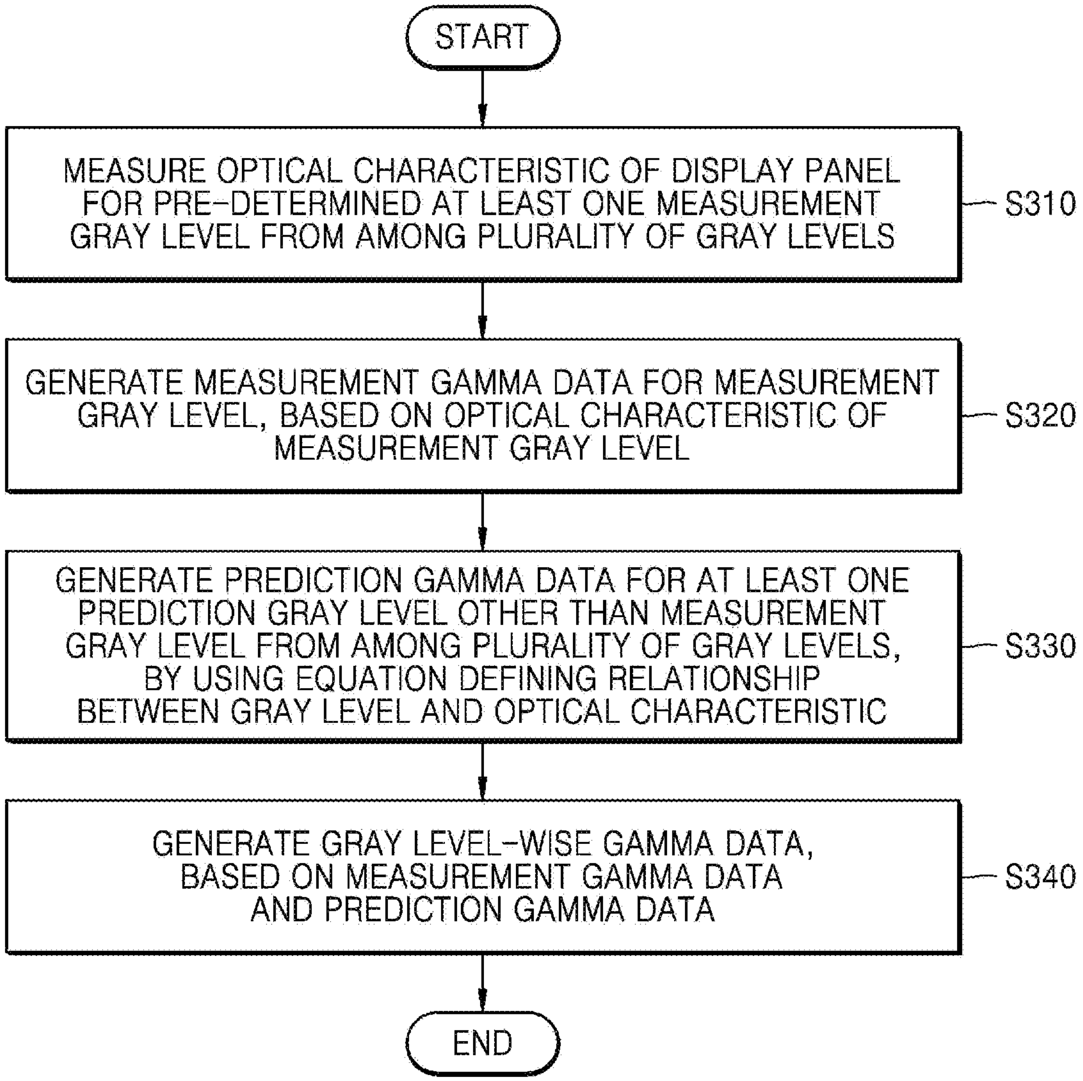
FIG. 3 is a flowchart of a gamma correction method for a display device, according to an embodiment.

FIG. 3 is a flowchart of a gamma correction method for a display device, according to an embodiment.

According to an embodiment, the gamma correction method of FIG. 3 for a display device may be performed by the gamma correction apparatus 120 shown in FIG. 1A.

Referring to FIG. 3, the gamma correction apparatus 120 may perform gamma correction on the display device 110, based on the gray level-wise gamma data generated based on the measurement gamma data and the prediction gamma data. The measurement gamma data may denote the gamma data for at least one measurement gray level, which is generated by the measurer 121 by measuring the optical characteristic of the display panel. The prediction gamma data may denote the gamma data for at least one prediction gray level, which is generated by using an equation defining a relationship between a gray level and an optical characteristic.

Here, the optical characteristic may denote characteristics related to luminance values and color coordinates of a plurality of gray levels for each of red, green, and blue. A gray level may be from 0 to 255, based on 8 bits. According to an embodiment, the measurement gray levels may be gray levels (e.g., a 255 gray level, a 151 gray level, and a 51 gray level) selected from among a 0 gray level to a 255 gray level (256 gray levels) having an interval of 1, which are used by the display device 110, and the prediction gray levels may be gray levels (e.g., a 203 gray level, an 87 gray level, and a 35 gray level) selected from among the remaining gray levels.

In detail, operation S310 may be an operation by which the measurer 121 measures the optical characteristic of the display panel for the pre-determined at least one measurement gray level from among the plurality of gray levels, and operation S320 may be an operation by which the gamma data generator 122 generates the measurement gamma data for the measurement gray level, based on the optical characteristic of the measurement gray level.

According to an embodiment, the measurer 121 may pre-determine the at least one measurement gray level for measuring the optical characteristic of the display panel, from among 0 to 255 gray levels, and the measurer 121 may measure the optical characteristic of the display panel for a corresponding measurement gray level. For example, when the 255 gray level corresponds to the pre-determined measurement gray level, the measurer 121 may measure optical characteristics of a luminance value and color coordinates in the 255 gray level of the display panel, and the gamma data generator 122 may generate the measurement gamma data for the 255 gray level, based on the optical characteristics of the 255 gray level received from the measurer 121.

Operation S330 may be an operation by which the gamma data generator 122 generates the prediction gamma data for the at least one prediction gray level other than the measurement gray level from among the plurality of gray level, by using the equation defining a relationship between a gray level and an optical characteristic.

According to an embodiment, when the optical characteristics of the plurality of display panels are measured by the measurer 121, the gamma data generator 122 may receive the data (hereinafter, optical characteristic data) for the optical characteristics of the plurality of display panels and configure the equation defining a relationship between a gray level and an optical characteristic. Here, the optical characteristic data of the display panel may denote optical characteristic data of a same type of display panels. The accuracy of the equation defining a relationship between a gray level and an optical characteristic may increase when the number of pieces of optical characteristic data of the plurality of display panels increases. The equation configured at this time may be an equation of at least a linear expression indicating a relationship between an independent variable and a dependent variable.

Operation S340 may be an operation by which the gamma data generator 122 generates the gray level-wise gamma data, based on the measurement gamma data and the prediction gamma data. Details thereof will be described below with reference to accompanying drawings.

For the pre-determined measurement gray level, the measurer 121 may measure the optical characteristic of the display panel and generate the measurement gamma data, based the measurement value, and for the at least one prediction gray level other than the pre-determined measurement gray level from among the plurality of gray levels, the gamma data generator 122 may generate the prediction gamma data, based on the pre-generated gamma data. Here, the pre-generated gamma data may include the measurement gamma data and/or the prediction gamma data. For example, the measurement gamma data for the 255 gray level may be generated when the 255 gray level is the measurement gray level, the prediction gamma data for the 203 gray level may be generated based on the measurement gamma data for the 255 gray level when the 203 gray level is the prediction gray level, the measurement gamma data for the 151 gray level may be generated by measuring an optical characteristic for the 151 gray level by the measurer 121 when the 151 gray level is the measurement gray level, the equation defining a relationship between a gray level and an optical characteristic may be generated based on the measurement gamma data of the 255 gray level, the prediction gamma data of the 203 gray level, and the measurement gamma data of the 151 gray level when the 87 gray level is the prediction gray level, and the prediction gamma data of the 87 gray level may be generated based on the generated equation.

Figure 4:
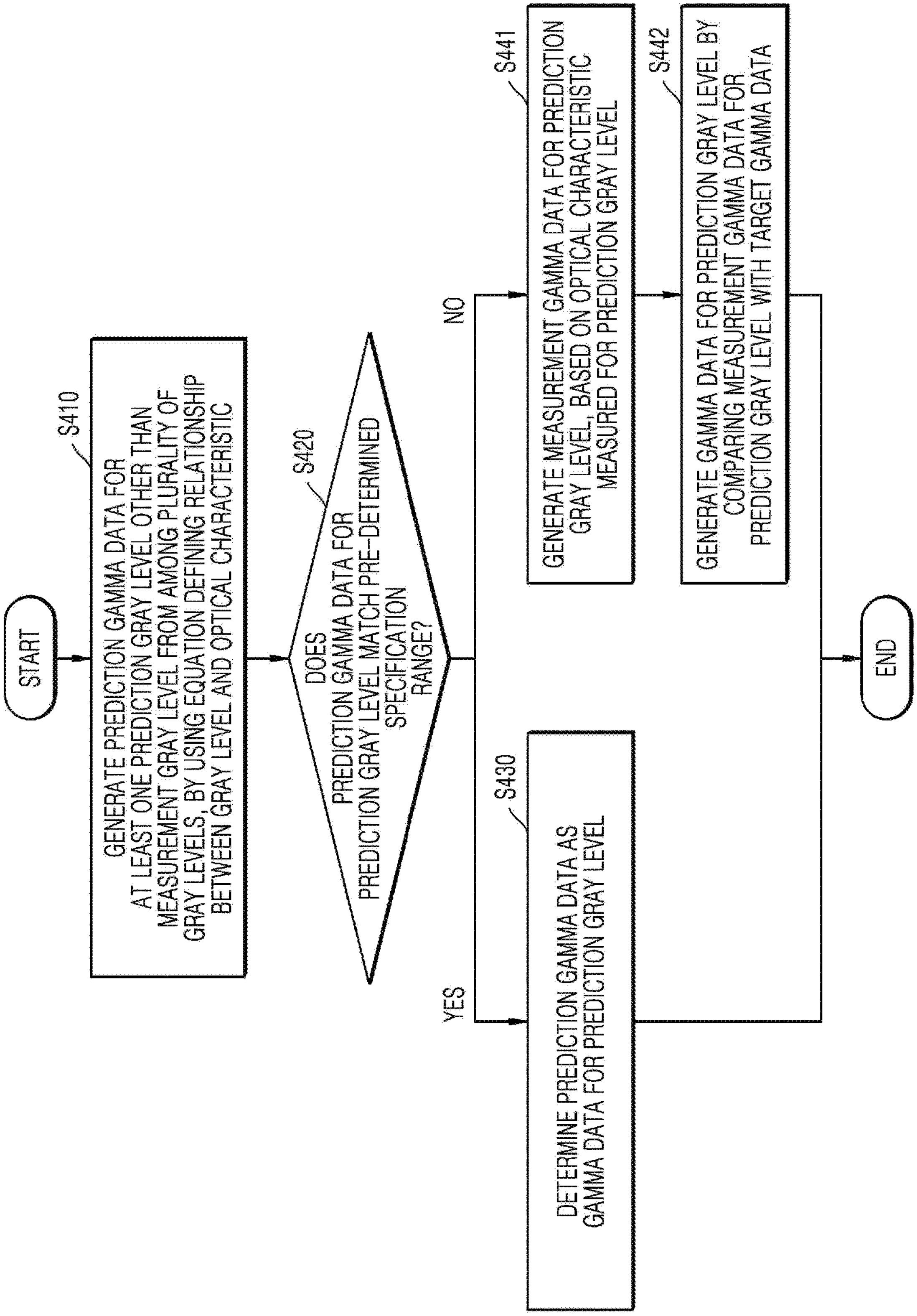
FIG. 4 is a flowchart showing generating of gamma data for a prediction gray level according to a pre-determined specification range, according to an embodiment.

FIG. 4 is a flowchart showing generating of the gamma data for the prediction gray level according to a pre-determined specification range, according to an embodiment.

According to an embodiment, the gamma data generator 122 may use the prediction gamma data of the prediction gray level as final gamma data for the prediction gray level only when the prediction gamma data matches the pre-determined specification range. When the prediction gamma data of the prediction gray level does not match the pre-determined specification range, the measurer 121 may measure the optical characteristic of the display panel for the corresponding prediction gray level and the gamma data generator 122 may generate the final gamma data of the prediction gray level, based on the measurement value. In detail, operation S410 may be an operation by which the gamma data generator 122 generates the prediction gamma data for the at least one prediction gray level other than the measurement gray level from among the plurality of gray level, by using the equation defining a relationship between a gray level and an optical characteristic.

In detail, the gamma data generator 122 may generate the prediction gamma data for the at least one prediction gray level other than the measurement gray level from among the plurality of gray level, by using the equation defining a relationship between a gray level and an optical characteristic (operation S410).

Operation S420 may be an operation of identifying whether the prediction gamma data for the prediction gray level matches the pre-determined specification range.

Operation S430 may be an operation of determining the prediction gamma data as the gamma data for the prediction gray level among the gray level-wise gamma data when the prediction gamma data for the prediction gray level matches the pre-determined specification range.

For example, when a luminance value of 100 nit is measured for the 255 gray level and color coordinates are (0.23, 0.38), and when the 203 gray level is included in the pre-determined prediction gray level, the prediction gamma data for the 203 gray level may be estimated based on the measurement gamma data for the 255 gray level, and may be determined as the gamma data of the 203 gray level based on a luminance value and color coordinates of the estimated prediction gamma data being within the pre-determined specification range.

Operation S441 may be an operation of generating the measurement gamma data for the prediction gray level, based on the optical characteristic measured for the prediction gray level when the prediction gamma data for the prediction gray level do not match the pre-determined specification range, and operation S442 may be an operation of generating the gamma data for the prediction gray level among the gray level-wise gamma data by comparing the measurement gamma data for the prediction gray level with target gamma data.

For example, when the luminance value of 100 nit is measured for the 255 gray level and the color coordinates are (0.23, 0.38), and when the 203 gray level is included in the pre-determined prediction gray level, the prediction gamma data for the 203 gray level may be estimated based on the measurement gamma data for the 255 gray level. When the luminance value and the color coordinates of the estimated prediction gamma data are not within the pre-determined specification range, the measurer 121 may generate the measurement gamma data by measuring the optical characteristic of the display panel for the 203 gray level and generate the gamma data of the 203 gray level by converting RGB data to match a target gamma data value through comparison with pre-stored target gamma data. Here, the RGB data may denote an RGB analog voltage value or an RGB digital code value.

Figure 5A:
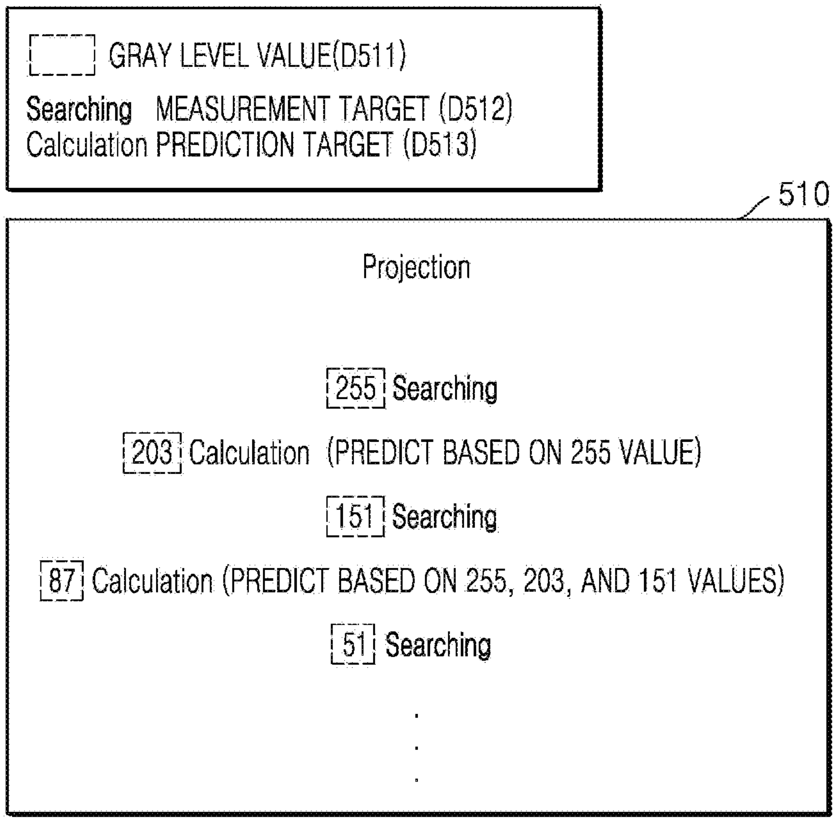
FIG. 5A is a diagram for describing predicting of a gamma value through interpolation, according to an embodiment.
Figure 5B:
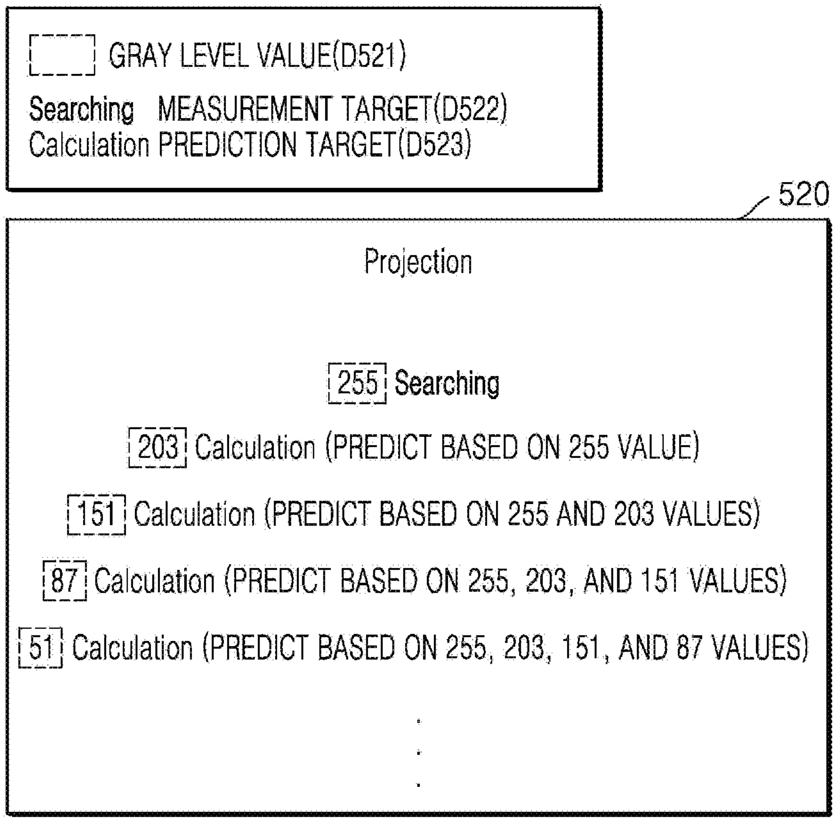
FIG. 5B is a diagram for describing predicting of a gamma value through extrapolation, according to an embodiment.

FIG. 5A is a diagram for describing predicting of a gamma value through interpolation, according to an embodiment, and FIG. 5B is a diagram for describing predicting of a gamma value through extrapolation, according to an embodiment.

Referring to a reference numeral 510 of FIG. 5A, for example, the measurement gamma data for the 255 gray level may be generated when the 255 gray level is the measurement gray level, the prediction gamma data for the 203 gray level may be generated based on the measurement gamma data for the 255 gray level when the 203 gray level is the prediction gray level, the measurement gamma data for the 151 gray level may be generated by measuring the optical characteristic for the 151 gray level by the measurer 121 when the 151 gray level is the measurement gray level, the equation defining a relationship between a gray level and an optical characteristic may be generated based on the measurement gamma data of the 255 gray level, the prediction gamma data of the 203 gray level, and the measurement gamma data of the 151 gray level when the 87 gray level is the prediction gray level, and the prediction gamma data of the 87 gray level may be generated based on the generated equation. Also, when the 51 gray level is the measurement gray level, the measurer 121 may generate the measurement gamma data for the 51 gray level by measuring the optical characteristic for the 51 gray level.

According to an embodiment, pieces of measurement gamma data of measurement gray levels that are measurement targets D512 from among a plurality of gray level values D511 may be pre-stored in a memory, and pieces prediction gamma data of prediction gray levels that are prediction targets D513 may be generated based on the stored pieces of measurement gamma data.

According to an embodiment, when the gamma data is generated from a high gray level to a low gray level from among the plurality of gray level values D511, the measurement gamma data or the prediction gamma data may be generated depending on whether a corresponding gray level belongs to the pre-determined measurement gray level or pre-determined prediction gray level. In this case, an equation indicating a correlation of optical characteristics of display panels may be generated based on pieces of gamma data of first to (N−1)th gray levels, and prediction gamma data of an Nth gray level may be generated based on the generated equation. Meanwhile, referring to a reference numeral 520 of FIG. 5B, for example, measurement gamma data for a 255 gray level may be generated when the 255 gray level from among a plurality of gray level values D521 is a measurement gray level D522, prediction gamma data for a 203 gray level may be generated based on the measurement gamma data for the 255 gray level when the 203 gray level is a prediction gray level, prediction gamma data for a 151 gray level may be generated based on the measurement gamma data for the 255 gray level and the prediction gamma data for the 203 gray level when the 151 gray level is a prediction gray level, an equation defining a relationship between a gray level and an optical characteristic may be generated based on the measurement gamma data of the 255 gray level, the prediction gamma data of the 203 gray level, and the prediction gamma data of the 151 gray level when a 87 gray level is a prediction gray level, and prediction gamma data of the 87 gray level may be generated based on the generated equation. Also, when a 51 gray level is a prediction gray level, prediction gamma data may be generated based on gamma data for the 255, 203, 151, and 87 gray levels. In this case, as described above with reference to FIG. 4, final gamma data may be determined depending on whether the generated prediction gamma data matches a pre-determined specification range. When the pieces of prediction gamma data of the 203, 151, 87, and 51 gray levels D523 match the pre-determined specification range, the pieces of prediction gamma data may be determined to be gamma data of the 203, 151, 87, and 51 gray levels.

Here, according to an embodiment, estimation of prediction gamma data of an initial prediction gray level may be performed by including not only measurement gamma data of an initial measurement gray level (e.g., the 255 gray level), but also information about dark data related to a black voltage (i.e., the voltage to generate 0 gray level) and a voltage indicating characteristics of a display panel. The voltage indicating the characteristics of the display panel may be a voltage applied to one electrode of an organic light-emitting diode ("OLED") that is a display element included in a pixel. For example, the OLED may include a pixel electrode and a common electrode facing the pixel electrode, and a first driving voltage ELVDD may be supplied to the pixel electrode and a second driving voltage ELVSS may be supplied to the common electrode. The voltage indicating the characteristics of the display panel may be the second driving voltage ELVSS applied to the common electrode.

A gray level to be measured and a gray level to be predicted may be changed. When the number of pieces of data for generating the equation increases, the accuracy of the equation increases, and thus the number of measurement gray levels may be decreased and the number of prediction gray levels may be increased. Accordingly, a gamma correction time may be effectively reduced. FIG. 5B illustrates an example in which the 151 gray level and the 51 gray level, which are measurement gray levels in FIG. 5A, are prediction gray levels.

The accuracy of the equation for generating prediction gamma data may be increased when the number of pieces of measurement gamma data increases, but considerable time and expenses may be consumed in generating final gamma data of a measurement gray level by comparing the measurement gamma data with target gamma data. Thus, in the disclosure, only a minimum number of pieces of measurement gamma data may be generated and prediction gamma data matching a pre-determined specification range may be generated to perform gamma correction of a display device.

Figure 5C:
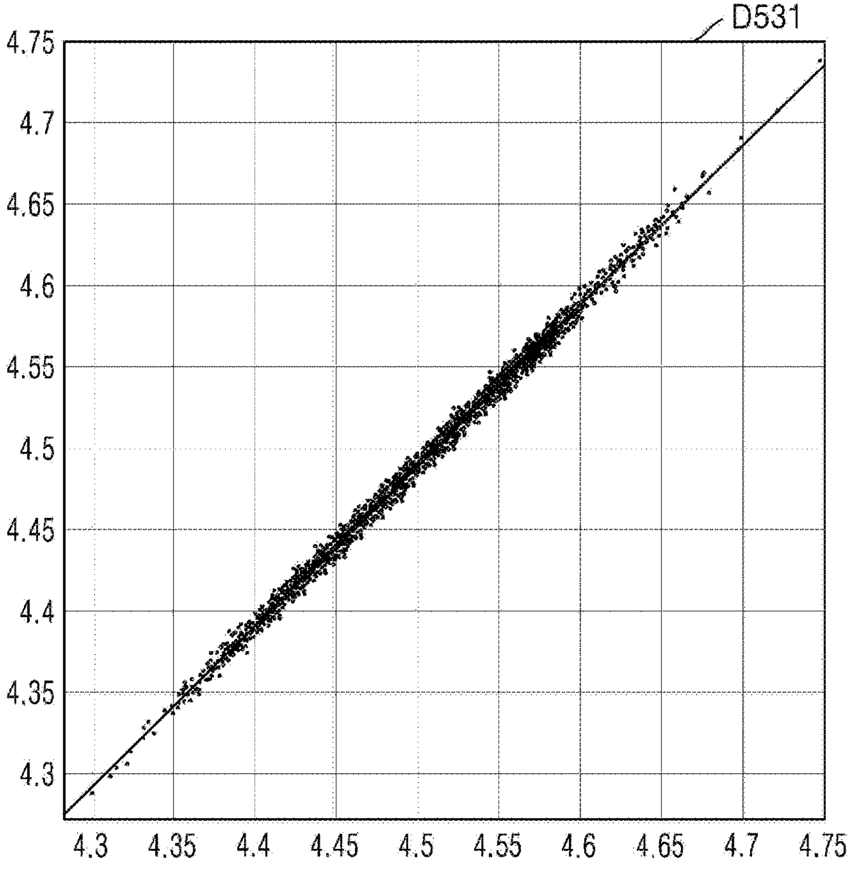
FIG. 5C is a diagram for describing adjusting of a parameter value through linear regression analysis during gamma value prediction, according to an embodiment.

FIG. 5C is a diagram for describing adjusting of a parameter value through linear regression analysis during gamma value prediction, according to an embodiment.

According to an embodiment, a parameter value of an equation defining a relationship between a gray level and an optical characteristic may be adjusted according to a linear regression analysis technique that is a statistical technique. Here, independent variables may be pre-generated pieces of gamma data for a measurement gray level and a prediction gray level, and a dependent variable may be prediction gamma data.

Referring to FIG. 5C, a reference numeral 530 indicates a parameter change analysis process through a linear regression analysis technique of prediction gamma data, which is performed by a processor of a gamma data generator, and a reference numeral D531 indicates a graph for identifying the accuracy of whether prediction gamma data matches a specification range by generating, by the gamma data generator, an equation defining a relationship between a gray level and an optical characteristic, performing linear regression analysis as big data of pieces of gamma data is accumulated, and defining that the accuracy is increased when prediction gamma data matches a pre-determined specification range. Also, a reference numeral D532 may be a screen illustrating, as linear analysis statistics, a multiple correlation coefficient, a determination coefficient, an adjusted determination coefficient, a standard error, and the number of observations, a reference numeral D533 may be a screen illustrating R, G, and B data and information about Y intercept in a 255 gray level while multi-time programming ("MTP") is performed, and a reference numeral D534 may be a screen illustrating, as a residual output, a prediction value, a residual, and a standard residual according to the number of observations.

Figure 6:
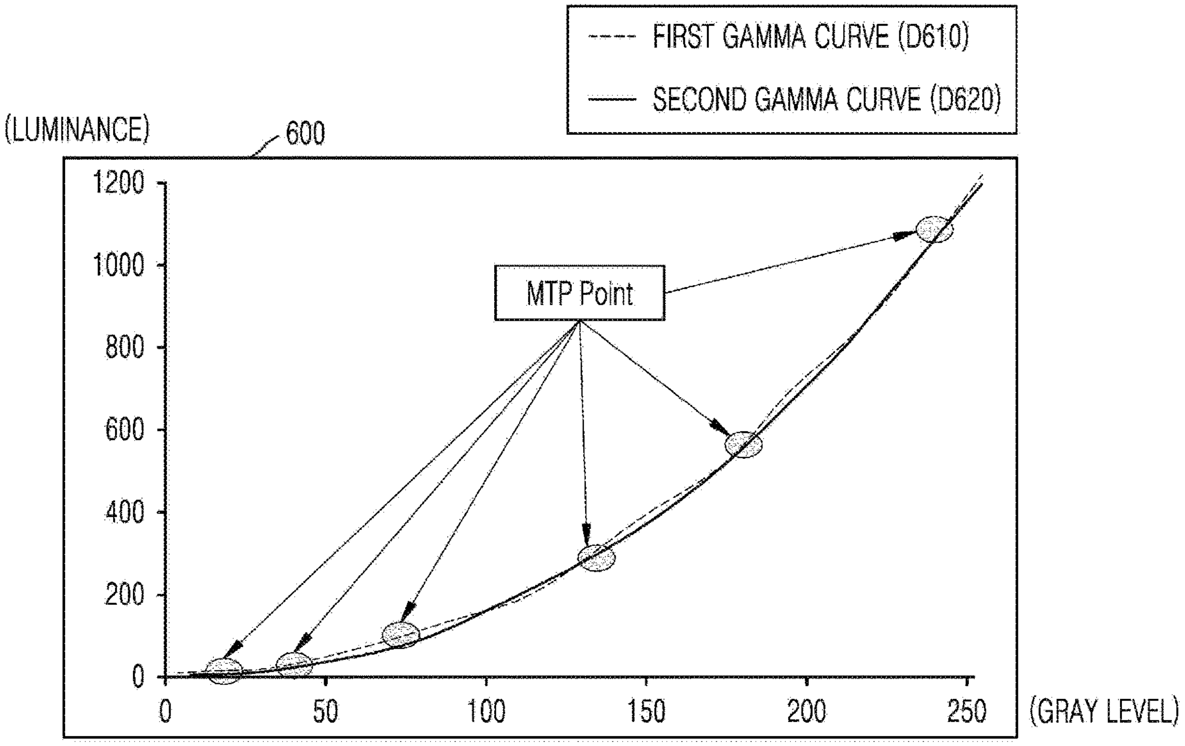
FIG. 6 is a diagram showing a first gamma curve being changed to a second gamma curve through linear regression analysis, according to an embodiment.

FIG. 6 is a diagram showing a first gamma curve D610 being changed to a second gamma curve D620 through linear regression analysis, according to an embodiment.

Referring to FIG. 6, there are six MTP points, and gray levels corresponding to the MTP points may denote pre-determined measurement gray levels. The gamma data generator 122 may generate measurement gamma data by receiving, from a measurer 121, a value obtained by measuring an optical characteristic of a display panel and change RGB data including information about color coordinates and a luminance value according to a gray level through comparison with target gamma data, thereby changing the measurement gamma data to the target gamma data. MTP may denote a process of adjusting an RGB value of the measurement gamma data such that the color coordinates of the target gamma data are maintained and the luminance value is adjusted to a desired luminance value by comparing the measurement gamma data with the target gamma data. The first gamma curve D610 may be a gamma curve formed based on measurement gamma data for a pre-determined measurement gray level according to an MTP point, and prediction gamma data for at least one prediction gray level other than the pre-determined measurement gray level from among a plurality of gray levels.

A graph 600 of FIG. 6 illustrates that the first gamma curve D610 is approximated to the second gamma curve D620, based on a parameter being changed as linear regression analysis according to FIG. 5C is performed. When the first gamma curve D610 is approximated to the second gamma curve D620, the accuracy of the prediction gamma data matching a pre-determined specification range may be increased. Here, the second gamma curve D620 may be a curve having a further accurate gamma value, based on the parameter of the first gamma curve D610 being changed as pieces of gamma data for the plurality of gray levels are accumulated.

Figure 7:
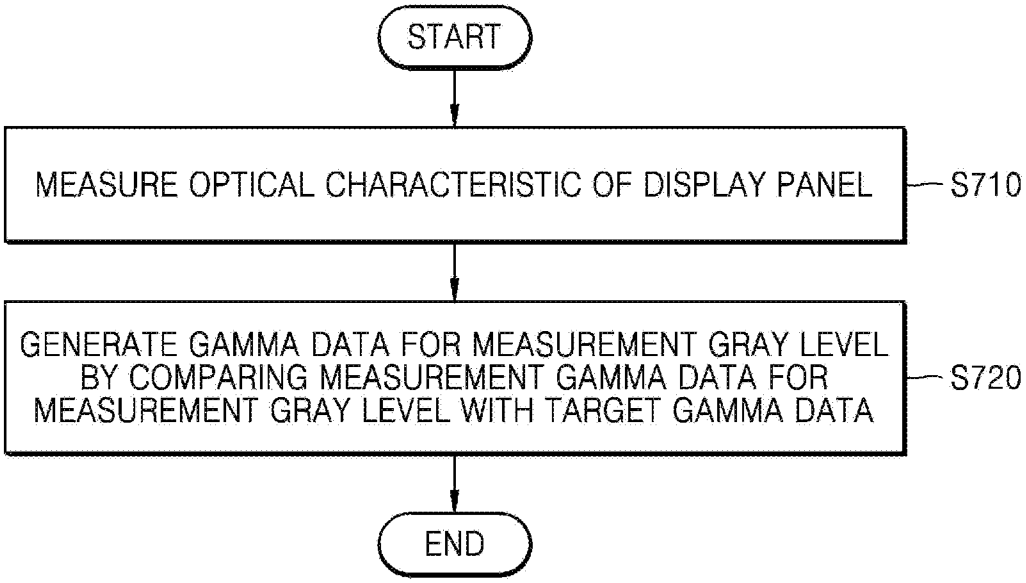
FIG. 7 is a flowchart showing generating of gamma data of a measurement gray level through comparison with target gamma data, according to an embodiment.

FIG. 7 is a flowchart showing generating of gamma data of a measurement gray level through comparison with target gamma data, according to an embodiment.

Operation S710 may be an operation of measuring an optical characteristic of a display panel, and operation S720 may be an operation of generating gamma data for a measurement gray level (among the gray level-wise gamma data in the operation S340) by comparing measurement gamma data for the measurement gray level with target gamma data.

In other words, a gamma data generator may generate measurement gamma data by receiving a value obtained by measuring, by a measurer, an optical characteristic of a display panel from a pre-determined measurement gray level, and change the measurement gamma data to target gamma data by changing RGB data including information about color coordinates and a luminance value according to a gray level through comparison with the target gamma data.

For example, when a 255 gray level is a measurement gray level, and a luminance value measured for the 255 gray level was 96 nit and color coordinates therefor were (0.25, 0.35), based on target gamma data being a luminance value of 100 nit and color coordinates of (0.27, 0.38) for the 255 gray level, measurement gamma data for the 255 gray level may be represented as RGB data (x, y, z) including information about the luminance value of 96 nit and the color coordinates of (0.25, 0.35), and values of x, y, and z may be appropriately changed through comparison with the luminance value of 100 nit and the color coordinates of (0.27, 0.38) for the target gamma data, thereby appropriately adjusting the RGB data according to the luminance value and color coordinates of the target gamma data.

Figure 8:
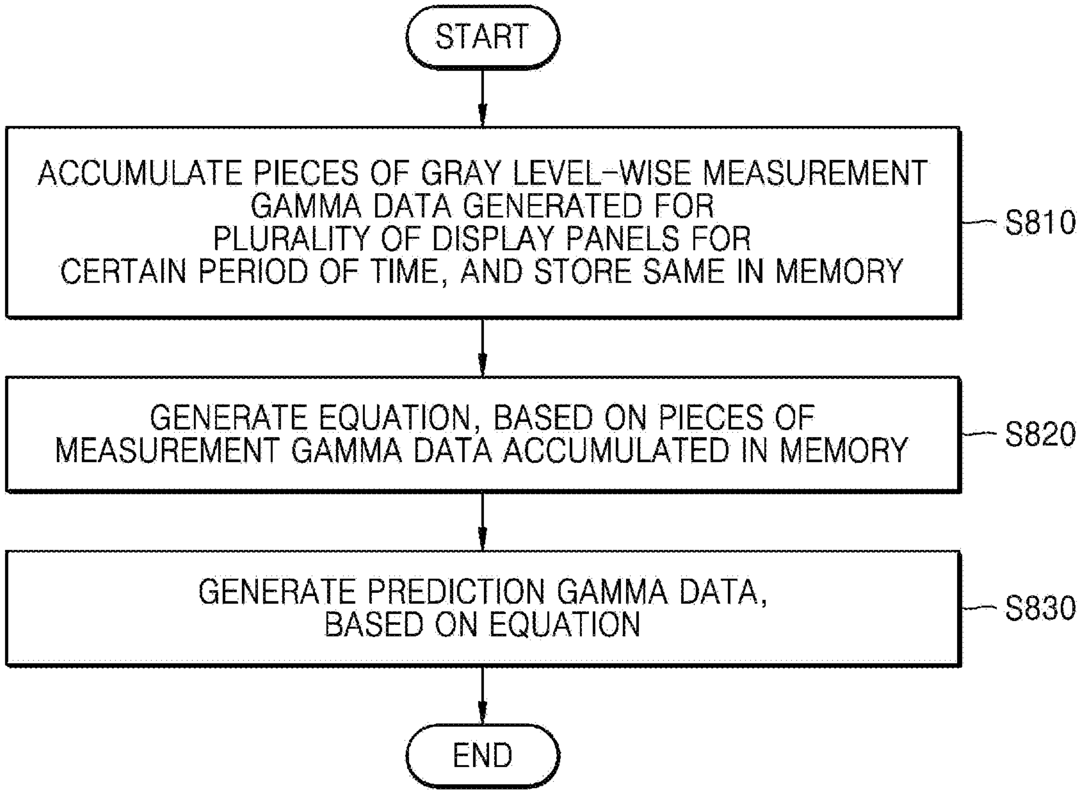
FIG. 8 is a flowchart showing generating of prediction gamma data from measurement gamma data pre-stored in a memory, according to an embodiment.

FIG. 8 is a flowchart showing generating of prediction gamma data from measurement gamma data pre-stored in a memory, according to an embodiment.

In detail, according to an embodiment, pieces of gray level-wise measurement gamma data generated for a plurality of display panels may be accumulated for a certain period of time and stored in a memory (operation S810), an equation may be generated based on the pieces of measurement gamma data accumulated in the memory (operation S820), and prediction gamma data may be generated based on the generated equation (operation S830).

Figure 9:
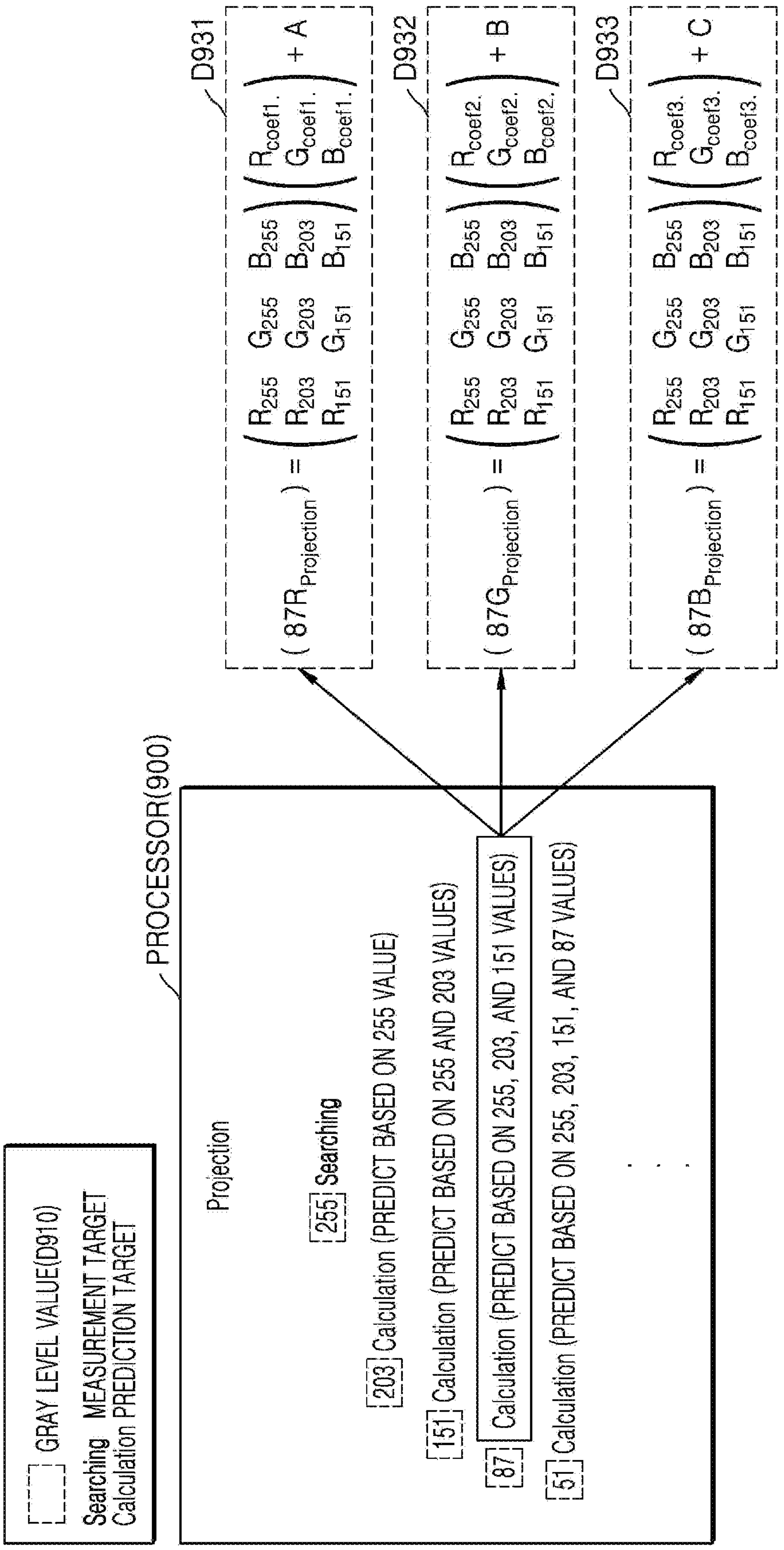
FIG. 9 is a diagram showing calculating of prediction gamma data for each RGB sub-pixel while generating gamma data of prediction gray level, according to an embodiment.

FIG. 9 is a diagram showing calculating of prediction gamma data for each RGB sub-pixel while generating gamma data of prediction gray level, according to an embodiment.

Referring to FIG. 9, a processor 900 of a gamma data generator may generate determinants D931, D932, and D933 for R, G, and B, respectively, in a gray level (e.g., a 87 gray level of FIG. 9) belonging to a prediction gray level from among a plurality of gray level values D910, and because prediction gamma data for the 87 gray level is generated based on pieces of gamma data of 255, 203, and 151 gray levels, an equation indicating a relationship between a gray level and an optical characteristic may be generated by adding a constant coefficient and constants A, B, and C, based on RGB data of the 255, 203, and 151 gray levels. Accordingly, the processor 900 may calculate prediction gamma data for each RGB sub-pixel.

FIG. 10 is a diagram showing a luminance value and color coordinates for a gray level being converted into RGB data for the gray level, according to an embodiment.

As described above, a luminance value and color coordinates for a gray level may be converted into RGB data for the gray level, and the RGB data may be data related to an RGB analog voltage value or a digital code.

Referring to FIG. 10, a table D1010 displays information about luminance values and color coordinates according to gray levels, and a table D1020 displays the luminance values and color coordinates being converted into RGB voltage values (dB V) according to the gray levels.

Here, the color coordinates need to be the same in overall, and prediction gamma data of a next prediction gray level may be generated by using the RGB voltage values in the table D1020 as base data of linear regression analysis.

When measurement gamma data is generated, an RGB voltage value for a gray level is appropriately adjusted such that color coordinates of the gray level are the same as color coordinates of target gamma data and a luminance value of the gray level is within a desired luminance value range. A final RGB voltage value at this time may be gamma data for the gray level.

Operations of a method or algorithm described in relation to an embodiment may be directly implemented in hardware, in a software module performed by hardware, or a combination thereof. The software module may be stored in RAM, ROM, EPROM, EEPROM, flash memory, hard disk, detachable disk, CD-ROM, or any type of computer-readable recording medium well known in the technical field of the disclosure.

According to the disclosure, a gamma value may be further accurately predicted through a gamma correction method for a display device, using big data.

According to the disclosure, time and costs required for gamma value prediction may be effectively reduced through a gamma correction method for a display device, using big data.

The effects of the disclosure are not limited to those mentioned above, and other effects that are not mentioned may be clearly understood by one of ordinary skill in the art from the detailed description.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A gamma correction apparatus for a display device, the gamma correction apparatus comprising:

a measurer configured to measure an optical characteristic of a display panel; and a gamma data generator configured to generate measurement gamma data for at least one measurement gray level pre-determined from among a plurality of gray levels, based on the optical characteristic received from the measurer, generate prediction gamma data for at least one prediction gray level other than the at least one measurement gray level from among the plurality of gray levels by using an equation defining a relationship between a gray level and an optical characteristic, and generate gray level-wise gamma data, based on the measurement gamma data and the prediction gamma data, wherein the optical characteristic comprises a luminance value and color coordinates, and the measurement gamma data and the prediction gamma data are each RGB data comprising information about the luminance value and the color coordinates.

2. The gamma correction apparatus of claim 1, wherein the gamma data generator is further configured to generate some of the gray level-wise gamma data for the at least one measurement gray level by comparing the measurement gamma data for the at least one measurement gray level, received from the measurer, with target gamma data.

3. The gamma correction apparatus of claim 1, wherein the gamma data generator is further configured to determine the prediction gamma data as some of the gray level-wise gamma data for the at least one prediction gray level when the prediction gamma data for the at least one prediction gray level matches a pre-determined specification range.

4. The gamma correction apparatus of claim 3, wherein the gamma data generator is further configured to receive, from the measurer, an optical characteristic measured for the at least one prediction gray level when the prediction gamma data for the at least one prediction gray level does not match the pre-determined specification range, and generate measurement gamma data for the at least one prediction gray level, based on the optical characteristic of the at least one prediction gray level.

5. The gamma correction apparatus of claim 4, wherein the gamma data generator is further configured to generate the some of the gray level-wise gamma data for the at least one prediction gray level by comparing the measurement gamma data for the at least one prediction gray level, received from the measurer, with target gamma data.

6. The gamma correction apparatus of claim 1, wherein the RGB data is an RGB analog voltage value.

7. The gamma correction apparatus of claim 1, wherein the RGB data is an RGB digital code value.

8. The gamma correction apparatus of claim 1, wherein the gamma data generator is further configured to generate the equation in real time, based on gamma data for the at least one measurement gray level and gamma data for the at least one prediction gray level, which are pre-generated.

9. The gamma correction apparatus of claim 1, wherein the color coordinates are determined based on a color temperature of 10000 Kevin (K).

10. A gamma correction apparatus for a display device, the gamma correction apparatus comprising:

a measurer configured to measure an optical characteristic of a display panel; and a gamma data generator configured to generate measurement gamma data for at least one measurement gray level pre-determined from among a plurality of gray levels, based on the optical characteristic received from the measurer, generate prediction gamma data for at least one prediction gray level other than the at least one measurement gray level from among the plurality of gray levels by using an equation defining a relationship between a gray level and an optical characteristic, and generate gray level-wise gamma data, based on the measurement gamma data and the prediction gamma data, wherein the gamma data generator comprises a memory in which pieces of measurement gamma data for each gray level, generated for a plurality of display panels, are accumulated for a certain period of time, and the gamma data generator is further configured to generate the equation, based on the pieces of measurement gamma data accumulated in the memory.

11. The gamma correction apparatus of claim 1, wherein the gamma data generator is further configured to generate the prediction gamma data in an order from a high gray level to a low gray level.

12. The gamma correction apparatus of claim 10, wherein the prediction gamma data is generated based on pieces of gamma data for the at least one measurement gray level and the at least one prediction gray level, which are pre-generated, a driving voltage of the display panel, and information about dark data.

13. The gamma correction apparatus of claim 12, wherein the equation is generated according to a linear regression analysis technique in which the prediction gamma data is a dependent variable and the pieces of gamma data for the at least one measurement gray level and the at least one prediction gray level, which are pre-generated, are independent variables.

14. The gamma correction apparatus of claim 10, wherein gray level-wise optical characteristics of the plurality of display panels are stored in the memory in a form of a look-up table.

15. A gamma correction method for a display device, the gamma correction method comprising:

measuring an optical characteristic of a display panel of the display device for at least one measurement gray level pre-determined from among a plurality of gray levels;

generating measurement gamma data for the at least one measurement gray level, based on an optical characteristic for the at least one measurement gray level;

generating prediction gamma data for at least one prediction gray level other than the at least one measurement gray level from among the plurality of gray levels, by using an equation defining a relationship between a gray level and an optical characteristic; and generating gray level-wise gamma data, based on the measurement gamma data and the prediction gamma data, wherein the equation is generated according to a linear regression analysis technique in which the prediction gamma data is a dependent variable and pieces of gamma data for the at least one measurement gray level and the at least one prediction gray level, which are pre-generated, are independent variables.

16. The gamma correction method of claim 15, wherein the generating of the gray level-wise gamma data comprises:

generating gamma data for the at least one measurement gray level among the gray level-wise gamma data by comparing the measurement gamma data for the at least one measurement gray level with target gamma data; and determining the prediction gamma data as gamma data for the at least one prediction gray level among the gray level-wise gamma data when the prediction gamma data for the at least one prediction gray level matches a pre-determined specification range.

17. The gamma correction method of claim 16, wherein the generating of the gray level-wise gamma data further comprises:

generating measurement gamma data for the at least one prediction gray level, based on an optical characteristic measured for the at least one prediction gray level, when the prediction gamma data for the at least one prediction gray level does not match the pre-determined specification range; and generating the gamma data for the at least one prediction gray level among the gray level-wise gamma data by comparing the measurement gamma data for the at least one prediction gray level with the target gamma data, when the prediction gamma data for the at least one prediction gray level does not match the pre-determined specification range.

18. The gamma correction method of claim 15, wherein the optical characteristic comprises a luminance value and color coordinates, and the measurement gamma data and the prediction gamma data are each RGB data comprising information about the luminance value and the color coordinates.

* * * * *